US010384307B2

(12) United States Patent
Matsuoka et al.

(10) Patent No.: US 10,384,307 B2
(45) Date of Patent: Aug. 20, 2019

(54) LASER MACHINING SYSTEM AND LASER MACHINING METHOD

(71) Applicant: Panasonic Intellectual Property Management Co., Ltd., Osaka (JP)

(72) Inventors: Noriyuki Matsuoka, Osaka (JP); Yasushi Mukai, Osaka (JP); Atsuhiro Kawamoto, Hyogo (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 15/326,400

(22) PCT Filed: Jul. 9, 2015

(86) PCT No.: PCT/JP2015/003462
§ 371 (c)(1),
(2) Date: Jan. 13, 2017

(87) PCT Pub. No.: WO2016/013171
PCT Pub. Date: Jan. 28, 2016

(65) Prior Publication Data
US 2017/0203388 A1 Jul. 20, 2017

(30) Foreign Application Priority Data

Jul. 23, 2014 (JP) .................. 2014-149642

(51) Int. Cl.
*B23K 26/06* (2014.01)
*B23K 26/08* (2014.01)
*B23K 26/10* (2006.01)
*G05B 19/19* (2006.01)
*B23K 101/00* (2006.01)
*B23K 26/064* (2014.01)

(52) U.S. Cl.
CPC ........ *B23K 26/064* (2015.10); *B23K 26/0643* (2013.01); *B23K 26/0648* (2013.01);
(Continued)

(58) Field of Classification Search
CPC ...... B23K 26/064; B23K 26/08; G05B 19/19; G05B 2219/45104
(Continued)

(56) References Cited

U.S. PATENT DOCUMENTS 6,100,497 A 8/2000 Maruyama et al.
2008/0191150 A1* 8/2008 Yamauchi .......... B23K 26/0876
250/492.1

FOREIGN PATENT DOCUMENTS

DE 37 00 190 10/1987
DE 3700190 A1 * 10/1987 ............. B23K 26/04
(Continued)

OTHER PUBLICATIONS

English translation of Search Report dated Nov. 16, 2017 in corresponding Chinese Application No. 201580039497.0.
(Continued)

*Primary Examiner* — Thien S Tran
(74) *Attorney, Agent, or Firm* — Wenderoth, Lind & Ponack, L.L.P.

(57) ABSTRACT

A laser machining system includes a laser oscillator, a laser machining head, and a reflection unit. The laser oscillator outputs laser light. The laser machining head, which includes a first optical member for collecting the laser light, emits the collected laser light. The reflection unit, which includes a reflective member for reflecting the laser light emitted from the laser machining head, radiates the reflected laser light onto a work.

16 Claims, 7 Drawing Sheets

(52) U.S. Cl.
CPC .......... *B23K 26/0665* (2013.01); *B23K 26/08* (2013.01); *B23K 26/0884* (2013.01); *B23K 26/0892* (2013.01); *B23K 26/10* (2013.01); *G05B 19/19* (2013.01); *B23K 2101/006* (2018.08); *G05B 2219/45104* (2013.01)

(58) Field of Classification Search
USPC ............ 219/121.63, 121.68, 121.69, 121.74, 219/121.78
See application file for complete search history.

(56) References Cited

FOREIGN PATENT DOCUMENTS

| | | |
|---|---|---|
| DE | 10 2010 025 375 | 12/2011 |
| JP | 60-006292 | 1/1985 |
| JP | 1-148486 | 6/1989 |
| JP | 3-238189 | 10/1991 |
| JP | 9-192866 | 7/1997 |
| JP | 10-277762 | 10/1998 |
| JP | 2001-191189 | 7/2001 |
| JP | 2004-255410 | 9/2004 |
| JP | 3955491 B | 8/2007 |
| JP | 2011-000625 | 1/2011 |
| JP | 2012-155159 | 8/2012 |
| WO | 2006/092827 | 9/2006 |

OTHER PUBLICATIONS

International Search Report of PCT application No. PCT/JP2015/003462 dated Oct. 13, 2015.

\* cited by examiner

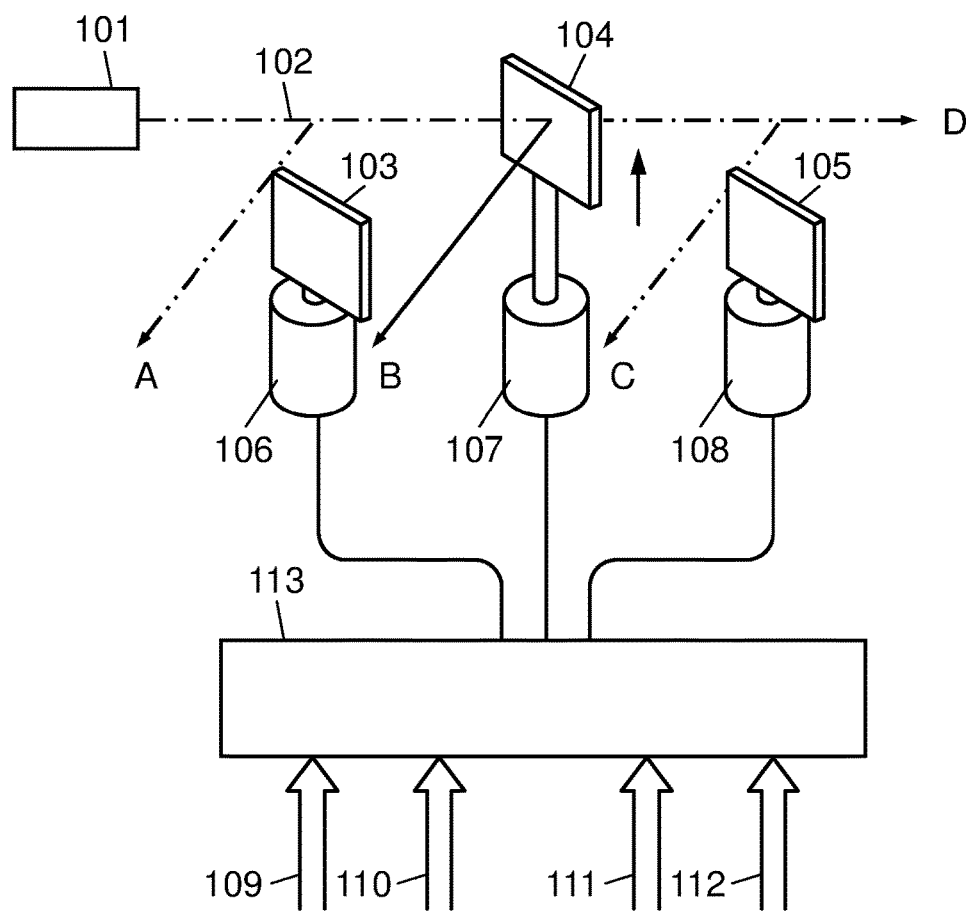

LASER MACHINING SYSTEM AND LASER MACHINING METHOD

CROSS-REFERENCE TO RELATED APPLICATIONS

This application is a U.S. national stage application of the PCT International Application No. PCT/JP2015/003462 filed on Jul. 9, 2015, which claims the benefit of foreign priority of Japanese patent application No. 2014-149642 filed on Jul. 23, 2014, the contents all of which are incorporated herein by reference.

TECHNICAL FIELD

The present disclosure relates to a laser machining system and a laser machining method, and more particularly, to machining a work by reflecting laser light emitted from a laser machining head onto the work.

BACKGROUND ART

When a work is machined using laser light (hereinafter, laser machining), the focal position, which is the focal point of the laser light, is to be determined as accurately as possible. This is because the energy density of the laser light is highest at the focal position where machining such as cutting and welding is most efficiently performed. Therefore, in laser machining, the focal length of laser light, which depends on the type of the optical system such as a condenser lens, is to be kept constant. If the focal length of laser light is not constant, the work is irradiated with laser light with varying energy density. As a result, laser machining is performed in unstable conditions, resulting in poor machining performance. To achieve satisfactory machining performance, not only the focal length of the laser light but also the distance between the laser machining head and the work (the work distance) are to be kept constant.

In laser machining, the radiation angle of the laser light with respect to a work is to be determined as accurately as possible. For example, in the case of laser welding, improper radiation angles of the laser light result in a shallow depth of weld penetration into the work, causing the machined work to have insufficient strength. The preferable radiation angle of the laser light with respect to a work is within ±10° from the direction perpendicular to the surface of the work to be machined.

For these reasons, the work distance and the radiation angle of the laser light have been set as optimal as possible.

Patent Literature 1 discloses a laser machine in which a three-axis positioner controls the posture of an object to be machined in such a manner that the surface of the object to be machined is perpendicular to the laser light.

Patent Literature 2 discloses a laser welding device in which the beam from one laser oscillator is distributed to a plurality of welders. The device of Patent Literature 2 will now be described with reference to FIG. 7. As shown in FIG. 7, according to the conventional laser welding device, select mirrors 103, 104, and 105, which can be moved back and forth by select mirror drive means 106, 107, and 108, respectively, are provided on the optical axis of beam 102 emitted from laser oscillator 101. Select mirror drive means 106 to 108 are coupled with select mirror controller 113. Controller 113 controls these means 106 to 108 in accordance with operating condition signals 109, 110, 111, and 112, received from welders A to D (not shown).

As shown in FIG. 7, when the beam is led to welder B, select mirror controller 113 drives select mirror drive means 107 to put select mirror 104 on the optical axis of beam 102. As a result, beam 102 is reflected by select mirror 104 and led to welder B. Similarly, when beam 102 is led to welder A, select mirror controller 113 drives select mirror drive means 106 to put select mirror 103 on the optical axis of beam 102. When beam 102 is led to welder C, select mirror controller 113 drives select mirror drive means 108 to put select mirror 105 on the optical axis of beam 102. When beam 102 is led to welder D, select mirror controller 113 does not drive select mirror drive means 106 to 108 so that beam 102 is led straight to welder D.

As described above, beam 102 of laser oscillator 101 is distributed to welders A to D, allowing laser oscillator 101 to occupy a small area in the laser welding device. In welders A to D, those waiting for the index to arrive are skipped, and the others in use for welding can sequentially receive beam 102 from laser oscillator 101. This makes the best use of the entire energy of single laser oscillator 101. Furthermore, select mirrors 103 to 105 can be moved without changing their angles of reflection, so that the stopping accuracy of these mirrors 103 to 105 is not influential at the time of selecting them.

CITATION LIST

Patent Literature

Patent Literature 1: Japanese Patent No. 3955491
Patent Literature 2: Japanese Unexamined Patent Application Publication No. S60-6292

SUMMARY OF THE INVENTION

However, the performance of the laser machine of Patent Literature 1 depends on the performance of the three-axis positioner, making it impossible to apply the laser machine for large-sized works. Meanwhile the laser welding device of Patent Literature 2 includes a plurality of select mirrors, a plurality of select mirror drive means, and, as indispensable components, a plurality of welders. Thus, the laser welding device has a complicated structure.

In order to solve the above problem, the laser machining system in accordance with the present disclosure includes a laser oscillator, a laser machining head, and a reflection unit. The laser oscillator outputs laser light. The laser machining head collects the light using a first optical member and emits the collected light. The reflection unit includes a reflective member for reflecting the light emitted from the laser machining head, and radiates the light reflected by the reflective member onto a work.

The laser machining method in accordance with the present disclosure includes an output step, an emission step, a reflection step, and a radiation step. In the output step, laser light is outputted from a laser oscillator. In the emission step, the outputted light is collected and emitted from a laser machining head. In the reflection step, the emitted light is reflected by a reflection unit. In the radiation step, the reflected light is radiated onto a work by the reflection unit.

According to the laser machining system and the laser machining method in accordance with the present disclosure, two or more portions to be machined apart from each other can be laser-machined using a simple structure including one laser oscillator, one laser machining head, and one reflection unit while the focal length and the radiation angle of the laser light are kept appropriately.

BRIEF DESCRIPTION OF DRAWINGS

FIG. 7 is a perspective view of part of a conventional laser machine.

DESCRIPTION OF EMBODIMENTS

First Exemplary Embodiment

Figure 1:
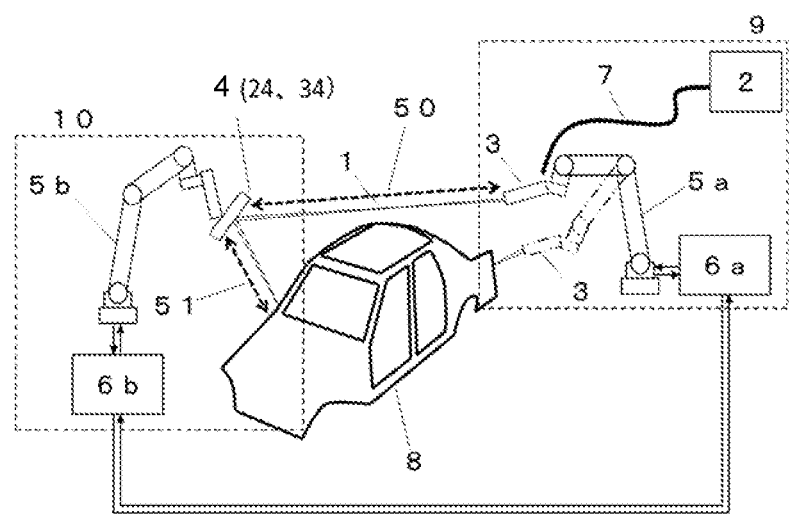
FIG. 1 is a schematic configuration view of a laser machining system in accordance with first to third exemplary embodiments.
Figure 2:
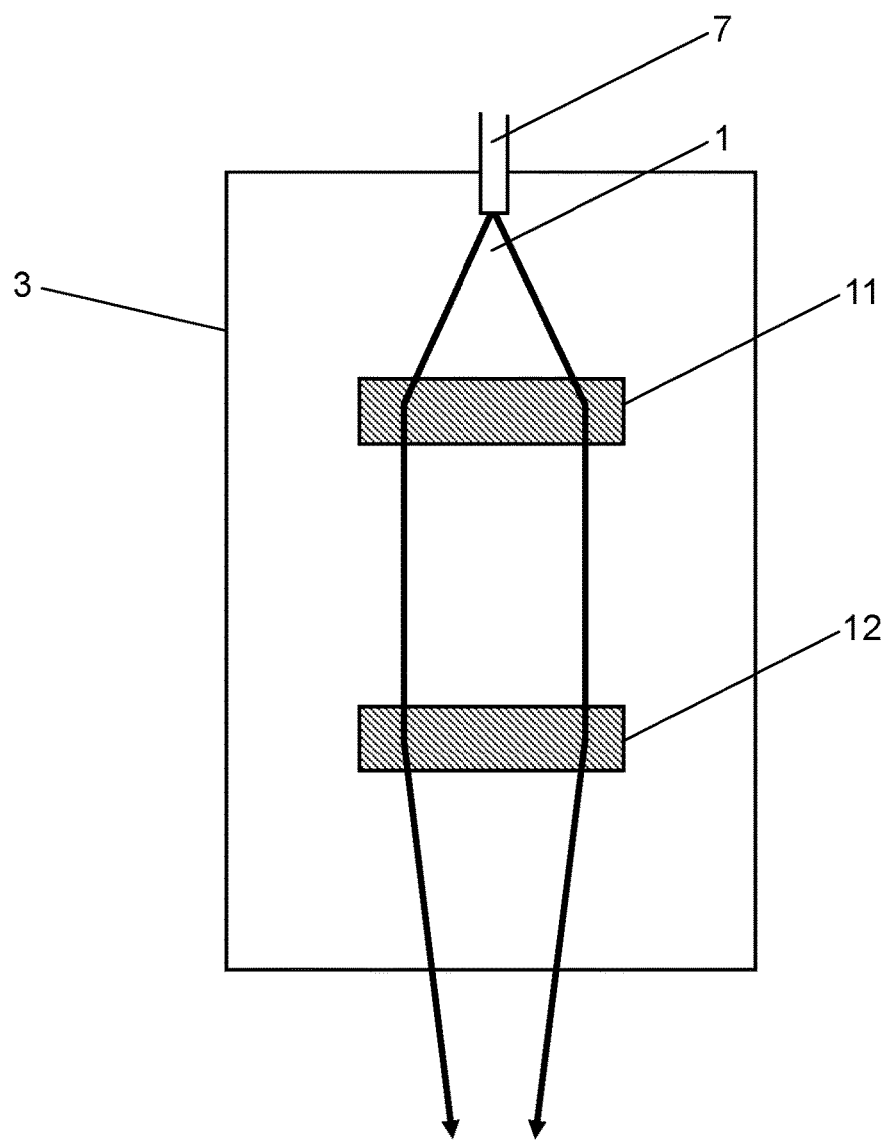
FIG. 2 is a schematic configuration view of a laser machining head in the first to fourth exemplary embodiments.
Figure 3:
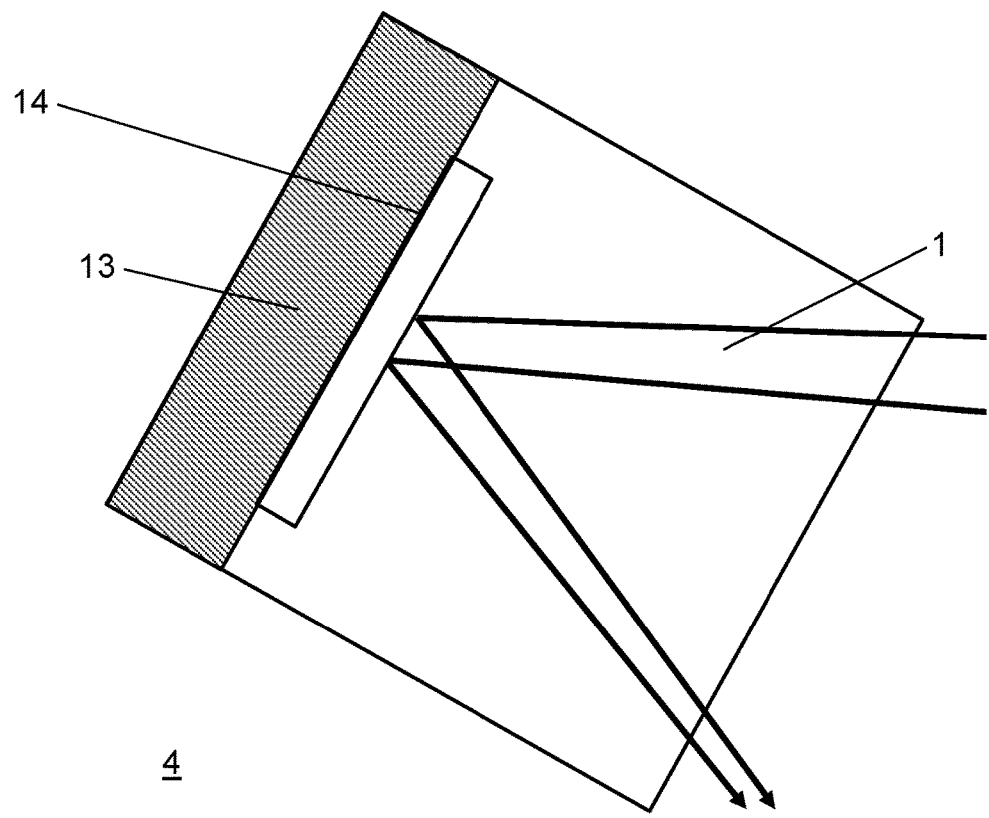
FIG. 3 is a schematic configuration view of a reflection unit in the first exemplary embodiment.

A first exemplary embodiment in accordance with the present disclosure will now be described with reference to FIGS. 1 to 3. FIG. 1 is a schematic configuration view of a laser machining system in accordance with the present exemplary embodiment. FIGS. 2 and 3 are schematic configuration views of a laser machining head and a reflection unit, respectively, in the present exemplary embodiment.

As shown in FIG. 1, the laser machining system in accordance with the present exemplary embodiment includes laser radiation system 9 for radiating laser light 1, and laser reflection system 10 for reflecting laser light 1 onto work 8.

Laser radiation system 9 includes laser oscillator 2, laser machining head 3, manipulator 5a (first manipulator), robot controller 6a (first robot controller), and laser transmission means 7 such as optical fiber. Laser machining head 3 is attached to the tip of manipulator 5a. The laser light from laser oscillator 2 is led to head 3 via laser transmission means 7. Robot controller 6a is coupled to manipulator 5a and controls its operation.

Laser reflection system 10 includes reflection unit 4, manipulator 5b (second manipulator), and robot controller 6b (second robot controller). Reflection unit 4 is attached to the tip of manipulator 5b. Robot controller 6b is coupled to manipulator 5b and controls its operation.

Laser radiation system 9 will now be described in more detail. Examples of the laser from laser oscillator 2 include solid-state lasers such as YAG and DISK, fiber lasers, and direct diode lasers. Laser machining head 3 preferably includes a Galvano mirror, but is acceptable as long as it is an optical system to collect laser light 1, such as an optical member (first optical member) including collimator lens 11 (first collimator lens) and focus lens 12 (first condenser lens) as shown in FIG. 2. Laser machining head 3 emits light 1 led by laser transmission means 7 in such a manner as to make it collected at first focal length. Laser transmission means 7 may transmit light 1 by a flexible cable made of, for example, optical fiber or by mirror reflection.

Laser reflection system 10 will now be described in more detail. As shown in FIG. 3, reflection unit 4 includes reflective member 14 and radiator 13 for radiating the heat of reflective member 14. Reflective member 14 is intended to make laser light 1 suffer as little energy loss as possible. Therefore, reflective member 14 is made of material with low transmission and absorption and high reflectivity (e.g., at least 90%) of laser light 1, or includes a layer made of such material. Examples of the material for reflective member 14 having high reflectivity include gold, silver, copper, aluminum, and other metals. It is preferable that reflective member 14 should be coated on its mirror surface with a magnesium fluoride, silicon oxide, or dielectric film in order to improve the reflectivity or to protect the surface. Another example of reflective member 14 is a mirror with a glass substrate coated with a dielectric multilayer film. It is preferable that radiator 13 should be made of metal with high thermal conductivity, and it is further preferable that radiator 13 should be a water-cooled type with coolant water circulating inside.

Manipulator 5a of laser radiation system 9 and manipulator 5b of laser reflection system 10 are to be flexible in movement to keep a constant work distance or to keep an appropriate radiation angle of laser light 1 with respect to the work. To meet this requirement, manipulators 5a and 5b are preferably articulated robots with six or more axes. Manipulator 5a (5b) may be replaced by a work table, a positioner, or other devices that can change the direction and position of radiation (reflection) of laser light 1. To make manipulators 5a and 5b operate cooperatively with each other, robot controllers 6a and 6b can be connected wired or wirelessly to exchange each other's information about position and posture.

A laser machining method, especially a laser welding method, using the above-described laser machining system will now be described with reference to FIGS. 1 to 3.

First, laser oscillator 2 outputs laser light 1 (output step). The outputted light 1 is led to laser machining head 3 via laser transmission means 7 such as fiber. Next, light 1 led to head 3 is collimated by collimator lens 11 and collected by focus lens 12 included in head 3, and then emitted from head 3 (emission step) as shown in FIG. 2.

Additionally, when the portion to be welded of work 8 is within the reach of laser light 1 from laser radiation system 9, work 8 is welded directly by light 1 emitted from laser machining head 3. In this case, in order to keep the work distance and the radiation angle of light 1 appropriately, robot controller 6a makes manipulator 5a perform laser welding.

The following is a description of the procedure for welding a portion of work 8 that is far from laser radiation system 9 or that is on the opposite side from system 9 as shown in FIG. 1. Laser light 1 emitted from laser machining head 3 is reflected onto work 8 by reflective member 14 of reflection unit 4 of laser reflection system 10 as shown in FIG. 3.

The distance between laser machining head 3 and reflective member 14 will be referred to as first distance 50, and the distance between reflective member 14 and work 8 will be referred to as second distance 51. The total distance of first and second distances 50 and 51 is the work distance. It is preferable that the focal length of laser light 1 collected by laser machining head 3 should be substantially equal the total distance. The total distance via reflection unit 4 is to be constant during laser machining. The work distance differs depending on the depth of focus determined by the optical system, and it is preferable that the allowable range of variation of the work distance should be constant within ±50 mm. If laser welding were performed while the work distance is changing over the allowable range of variation, the energy density of the portion of the work being welded would largely vary, resulting in unstable laser welding.

To avoid this occurring, the work distance is kept constant by coupling robot controllers 6a and 6b to each other and making manipulators 5a and 5b operate cooperatively with each other. For example, if the work distance is 100 cm, first and second distances 50 and 51 can be set to 70 cm and 30 cm, respectively, or to 80 cm and 20 cm, respectively. Since first and second distances 50 and 51 can be set rather freely, the radiation angle of laser light 1 is preferably selected. In addition, light 1 can be transmitted through a wider variety of routes, thereby greatly increasing the area that can be irradiated with light 1.

As described above, in the laser machining system in accordance with the present exemplary embodiment, laser welding can be performed without moving work 8, which may be large in size or complicated in structure. The absence of the necessity to move work 8 allows both space saving and cycle time reduction. This laser machining system is also cost effective because it does not need more than one laser transmission means or more than one laser welder. Furthermore, the cooperative operation of the two manipulators enables the work distance and the radiation angle of laser light 1 to be kept appropriately.

In the laser machining system and the laser machining method in accordance with the present exemplary embodiment described above, laser light 1 from laser machining head 3 is reflected to perform welding. Besides laser welding, laser cutting and other machining can be performed. Furthermore, reflection unit 4 includes one reflective member 14, but may alternatively include two or more reflective members 14. In addition, the laser machining system may include more than one laser reflection system 10. In the laser machining system and the laser machining method in accordance with the present exemplary embodiment described above, machining is performed with a constant work distance. The point is to perform laser machining with a constant energy density. Therefore, machining can alternatively be performed by moving the optical system and changing the work distance in accordance with the focal length that changes with the movement of the optical system.

Second Exemplary Embodiment

Figure 4:
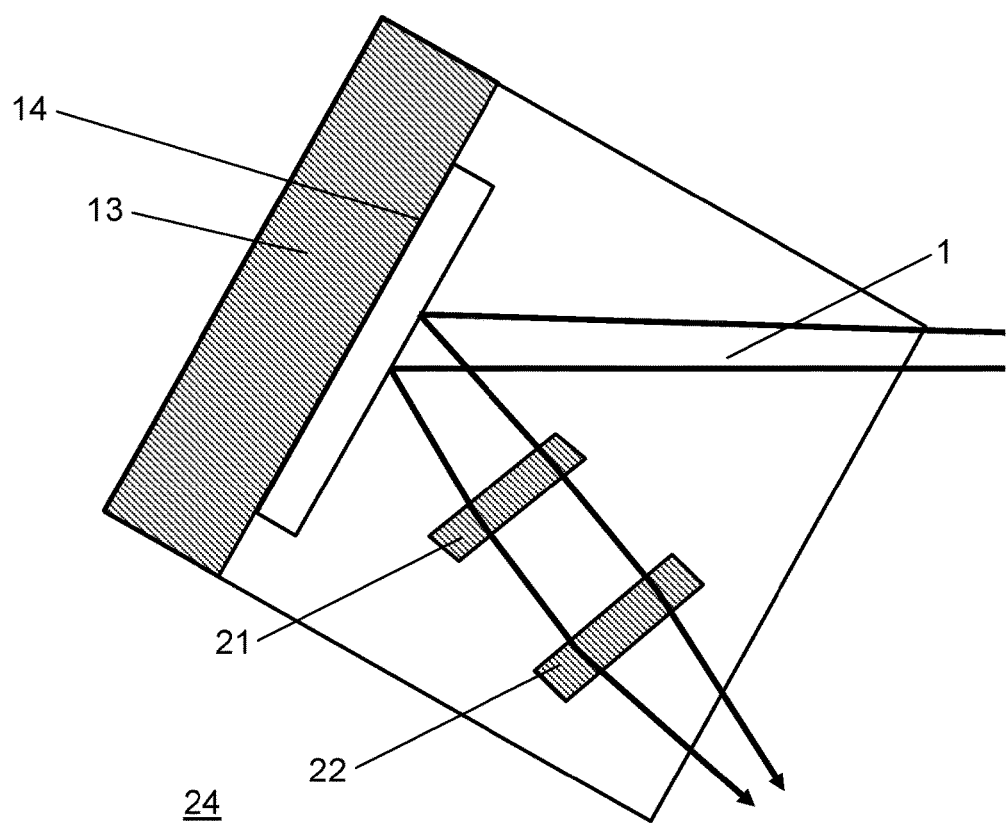
FIG. 4 is a schematic configuration view of a reflection unit in the second exemplary embodiment.

A second exemplary embodiment in accordance with the present disclosure will now be described with reference to FIGS. 1, 2, and 4. The configurations shown in FIGS. 1 and 2 are identical to those in the first exemplary embodiment and will not be described again in the present exemplary embodiment. The following description will be focused on features absent in the first exemplary embodiment. FIG. 4 is a schematic configuration view of a reflection unit in the present exemplary embodiment.

As shown in FIG. 4, the laser machining system in accordance with the present exemplary embodiment includes reflection unit 24, which has the function of collecting laser light 1 and includes reflective member 14. This function is effective especially when light 1 has a long radiation distance (the distance between the laser machining head and the portion to be machined). When reflection unit 4 does not have the function of collecting light 1, if the radiation distance of light 1 is larger than the focal length of laser machining head 3, light 1 expands. This reduces the energy density of light 1 at the portion to be machined, resulting in ineffective machining. Meanwhile, in the present exemplary embodiment, reflection unit 24, which has the function of collecting light 1, again collects light 1 emitted from laser machining head 3. As a result, light 1 can be focused again on the portion to be machined even if light 1 has a long radiation distance.

In FIG. 4, reflection unit 24 has a mechanism to collect laser light 1 that has been emitted from laser machining head 3 and reached reflection unit 24. As shown in FIG. 4, reflection unit 24 is a combination of reflection unit 4 and an optical member (second optical member), which includes collimator lens 21 (second collimator lens) and focus lens 22 (second condenser lens). Reflective member 14 and radiator 13 are identical to those included in reflection unit 4 of the first exemplary embodiment. In reflection unit 24, laser light 1 emitted from laser machining head 3 and started to expand after passing through the focal position is reflected by reflective member 14, collimated by collimator lens 21, and collected by focus lens 22. With this configuration, reflection unit 24 can collect laser light 1 emitted from laser machining head 3 at the second focal length.

Next, the laser machining method in accordance with the present exemplary embodiment will now be described by taking a laser welding method as an example. The following description will be focused on features absent in the first exemplary embodiment while omitting the common parts.

The laser welding method of the present exemplary embodiment differs from the one in the first exemplary embodiment in that reflection unit 24 has the function of collecting laser light 1. Similar to the first exemplary embodiment, the distance between laser machining head 3 and reflection unit 24 will be referred to as first distance 50, and the distance between reflection unit 24 and work 8 will be referred to as second distance 51 (see FIG. 1). In the present exemplary embodiment, laser light 1 is to pass through the focal position and to start to expand before reaching collimator lens 21 of reflection unit 24. In other words, first distance 50 is to be larger than the first focal length of laser machining head 3. Second distance 51 between reflection unit 24 and work 8 is the work distance, and is constant and substantially equal to the second focal length of reflection unit 24. The allowable range of variation of the work distance is preferably constant within ±50 mm in the same manner as in the first exemplary embodiment.

First distance 50 in the present exemplary embodiment can be set rather freely as long as it is longer than the first focal length. This increases the degree of freedom in layout of the laser machining system and also greatly increases the weldable area. It is, however, further preferable that first distance 50 should be constant for the following reason. The larger first distance 50, the wider the beam of light 1. Therefore, the second focal length changes with a change in the beam diameter of light 1 incident on collimator lens 21 or focus lens 22 of reflection unit 24. This changes the beam diameter (spot diameter) at the focal position, which is the portion to be welded, resulting in uneven welding. If light 1 emitted from laser machining head 3 expands too much, light 1 might be too wide to be accepted by reflection unit 24 or by collimator lens 21 or focus lens 22 after reflection. That is the reason why first distance 50 is preferably constant (within the allowable range of variation of ±300 mm).

Third Exemplary Embodiment

A third exemplary embodiment in accordance with the present disclosure will now be described with reference to FIGS. 1, 2, and 5. The configurations shown in FIGS. 1 and 2 are identical to those in the second exemplary embodiment and will not be described again in the present exemplary embodiment. The following description will be focused on features absent in the second exemplary embodiment. FIG.

5 is a schematic configuration view of a reflection unit in the present exemplary embodiment.

Figure 5:
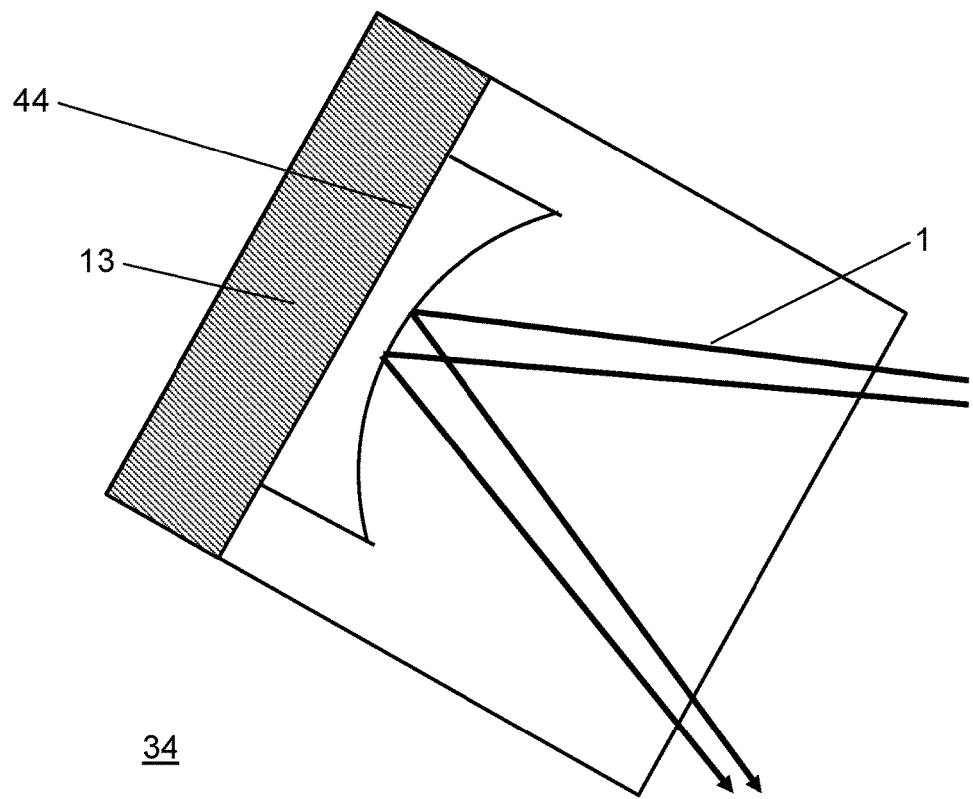
FIG. 5 is a schematic configuration view of a reflection unit in the third exemplary embodiment.

As shown in FIG. 5, the laser machining system in accordance with the present exemplary embodiment includes reflection unit 34, which has the function of collecting laser light 1 and includes reflective member 44 with a concave surface. Light 1 is collected by collimator lens 21 and focus lens 22 in the second exemplary embodiment, but is collected by reflective member 44 in the present exemplary embodiment. Reflective member 44 performs reflection and collection of light 1 simultaneously, thereby preventing energy loss, which would be caused when light 1 passes through collimator lens 21 or focus lens 22.

In the present exemplary embodiment, the same configurations as in the first and second exemplary embodiments have the same effects as in the first and second exemplary embodiments.

Fourth Exemplary Embodiment

Figure 6:
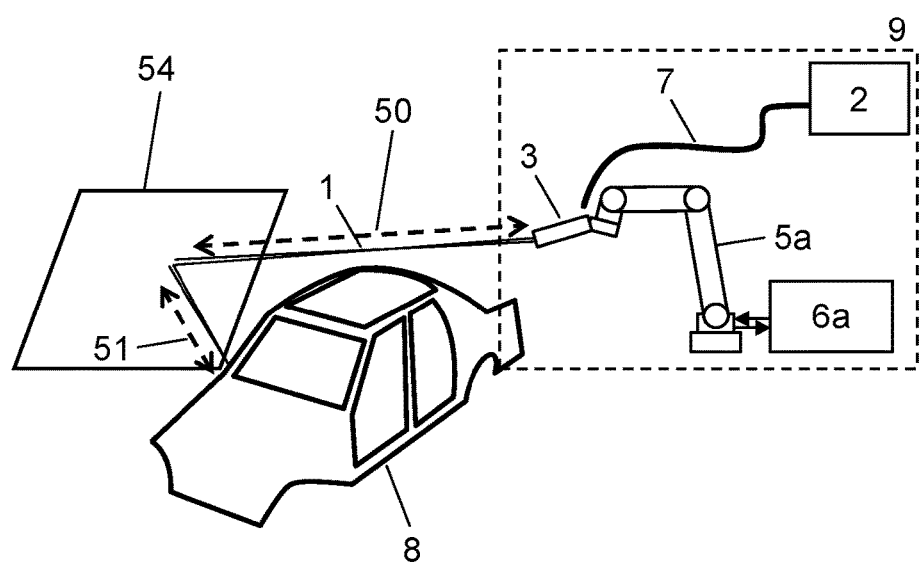
FIG. 6 is a schematic configuration view of a laser machining system in accordance with a fourth exemplary embodiment.

A fourth exemplary embodiment in accordance with the present disclosure will now be described with reference to FIGS. 2 and 6. The configuration shown in FIG. 2 is identical to that in the first exemplary embodiment and will not be described again in the present exemplary embodiment. The following description will be focused on features absent in the first exemplary embodiment. FIG. 6 is a schematic configuration view of a laser machining system in accordance with the present exemplary embodiment.

As shown in FIG. 6, in the laser machining system of the present exemplary embodiment, laser reflection system 10 is replaced by fixed reflective member 54, which is used as a reflection unit. This configuration eliminates the need to provide manipulator 5b and robot controller 6b included in the laser reflection system, and hence, makes the laser machining system have a simple structure. Reflective member 54 may be fixed on a wall surface or attached to a base. Reflective member 54 can be made of the same material and have the same structure as those of reflective member 14 used in the first exemplary embodiment.

In the present exemplary embodiment, the same configurations as in the first exemplary embodiment have the same effects as in the first exemplary embodiment.

As described above, in the laser machining system and the laser machining method in accordance with the first to fourth exemplary embodiments, machining is performed while keeping the work distance constant. However, the point is to perform machining while the energy density of the laser light is kept constant at the portion of work 8 to be radiated. Therefore, machining may be performed by providing a zoom function to at least one of laser machining head 3 and reflection units 4, 24, and 34, and changing the work distance according to the focal length, which is changed by the zoom function.

INDUSTRIAL APPLICABILITY

The laser machining system and the laser machining method in accordance with the present disclosure are industrially useful because of the feature that two or more portions to be machined apart from each other can be laser-machined using a simple structure while the focal length and the radiation angle of the laser light are kept appropriately.

The invention claimed is:

1. A laser machining system for machining a work with laser light, the laser machining system comprising:
a laser oscillator configured to output laser light;
a laser machining head configured to collect the laser light using a first optical member and to emit the collected laser light;
a first laser radiation system comprising:
a first manipulator to which the laser machining head is attached, the first manipulator being configured to change a position of the laser machining head; and
a first controller configured to control operation of the first manipulator; and
a second laser radiation system comprising:
a reflective member configured to reflect the laser light emitted from the laser machining head;
a reflection unit configured to radiate the laser light reflected by the reflective member;
a second manipulator to which the reflection unit is attached, the second manipulator being configured to change a position of the reflection unit; and
a second controller configured to control operation of the second manipulator,
wherein when machining a portion of the work that is on an opposite side from the first laser radiation system, the first controller and the second controller connected to each other make the first manipulator and the second manipulator operate cooperatively with each other, so that the laser light emitted from the laser machining head of the first laser radiation system is reflected by the reflective member of the second laser radiation system and radiated onto the work, and
wherein the first manipulator and the second manipulator operate in such a manner as to make a sum of a first distance and a second distance constant, the first distance being between the laser machining head and the reflection unit, the second distance being between the reflection unit and the work.

2. The laser machining system according to claim 1, wherein the first manipulator and the second manipulator operate in such a manner that each of the first distance and the second distance is constant.

3. A laser machining system for machining a work with laser light, the laser machining system comprising:
a laser oscillator configured to output laser light;
a laser machining head configured to collect the laser light using a first optical member and to emit the collected laser light;
a first laser radiation system comprising:
a first manipulator to which the laser machining head is attached, the first manipulator being configured to change a position of the laser machining head; and
a first controller configured to control operation of the first manipulator; and
a second laser radiation system comprising:
a reflective member configured to reflect the laser light emitted from the laser machining head;
a reflection unit configured to radiate the laser light reflected by the reflective member;
a second manipulator to which the reflection unit is attached, the second manipulator being configured to change a position of the reflection unit; and
a second controller configured to control operation of the second manipulator,
wherein when machining a portion of the work that is on an opposite side from the first laser radiation system, the first controller and the second controller connected to each other make the first manipulator and the second manipulator operate cooperatively with each other, so that the laser light emitted from the laser machining head of the first laser radiation system is reflected by the reflective member of the second laser radiation system and radiated onto the work, and wherein the reflection unit includes a second optical member configured to collect the laser light reflected by the reflective member.

4. The laser machining system according to claim 3, wherein the second optical member comprises:
a second collimator lens configured to collimate the laser light reflected by the reflective member; and
a second condenser lens configured to collect the collimated laser light.

5. A laser machining system for machining a work with laser light, the laser machining system comprising:
a laser oscillator configured to output laser light;
a laser machining head configured to collect the laser light using a first optical member and to emit the collected laser light;
a first laser radiation system comprising:
a first manipulator to which the laser machining head is attached, the first manipulator being configured to change a position of the laser machining head; and
a first controller configured to control operation of the first manipulator; and
a second laser radiation system comprising:
a reflective member configured to reflect the laser light emitted from the laser machining head;
a reflection unit configured to radiate the laser light reflected by the reflective member;
a second manipulator to which the reflection unit is attached, the second manipulator being configured to change a position of the reflection unit; and
a second controller configured to control operation of the second manipulator,
wherein when machining a portion of the work that is on an opposite side from the first laser radiation system, the first controller and the second controller connected to each other make the first manipulator and the second manipulator operate cooperatively with each other, so that the laser light emitted from the laser machining head of the first laser radiation system is reflected by the reflective member of the second laser radiation system and radiated onto the work, and
wherein the reflective member of the reflection unit has a concave surface.

6. The laser machining system according to claim 3, wherein the second manipulator operates in such a manner to make a second distance between the reflection unit and the work constant.

7. The laser machining system according to claim 1, wherein the reflection unit is a fixed reflective member.

8. A laser machining system for machining a work with laser light, the laser machining system comprising:
a laser oscillator configured to output laser light;
a laser machining head configured to collect the laser light using a first optical member and to emit the collected laser light;
a first laser radiation system comprising:
a first manipulator to which the laser machining head is attached, the first manipulator being configured to change a position of the laser machining head; and
a first controller configured to control operation of the first manipulator; and
a second laser radiation system comprising:
a reflective member configured to reflect the laser light emitted from the laser machining head;
a reflection unit configured to radiate the laser light reflected by the reflective member;

a second manipulator to which the reflection unit is attached, the second manipulator being configured to change a position of the reflection unit; and
a second controller configured to control operation of the second manipulator,
wherein when machining a portion of the work that is on an opposite side from the first laser radiation system, the first controller and the second controller connected to each other make the first manipulator and the second manipulator operate cooperatively with each other, so that the laser light emitted from the laser machining head of the first laser radiation system is reflected by the reflective member of the second laser radiation system and radiated onto the work, and
wherein the first optical member comprises:
a first collimator lens configured to collimate the laser light outputted from the laser oscillator; and
a first condenser lens configured to collect the collimated laser light.

9. A laser machining method for machining a work with laser light, the laser machining method comprising:
outputting laser light from a laser oscillator;
collecting the outputted laser light to emit the collected laser light from a laser machining head;
reflecting the emitted laser light by a reflection unit; and
radiating the reflected laser light by the reflection unit, wherein
when machining a portion of the work that is on an opposite side from the laser machining head, the laser light emitted from the laser machining head in the step of emitting the collected laser light and then reflected by the reflection unit in the step of reflecting the emitted laser light is radiated onto the work, and
wherein a sum of a first distance and a second distance is kept constant during laser machining, the first distance being between the laser machining head and the reelection unit, the second distance being between the reflection unit and the work.

10. The laser machining method according to claim 9, further comprising collecting the reflected laser light by the reflection unit,
wherein the collected laser light is radiated onto the work in the step of radiating the reflected laser light.

11. The laser machining method according to claim 10, wherein the laser light has a constant distance to travel after being reflected in the step of reflecting the emitted laser light and before reaching the work.

12. The laser machining system according to claim 1, wherein when a portion to be welded of the work is within reach of the laser light from the first laser radiation system, the laser light is configured to directly radiate onto the work.

13. The laser machining system according to claim 3, wherein when a portion to he welded of the work is within reach of the laser light from the first laser radiation system, the laser light is configured to directly radiate onto the work.

14. The laser machining system according to claim 5, wherein when a portion to be welded of the work is within reach of the laser light from the first laser radiation system, the laser light is configured to directly radiate onto the work.

15. The laser machining system according to claim 8, wherein when a portion to be welded of the work is within reach of the laser light from the first laser radiation system, the laser light is directly radiate onto the work.

16. The laser machining system according to claim. 9, wherein when a portion to be welded of the work is within reach of the laser light from the laser machining head in the step of emitting the collected laser light, the laser light is directly radiated onto the work.

* * * * *